June 10, 1958 B. G. MARKHAM ET AL 2,838,132
MEANS FOR REMOVING MOISTURE FROM A GAS
Filed Dec. 19, 1955

INVENTORS
B. G. MARKHAM +
R. M. DENNING

By Mawhinney & Mawhinney
ATTYS.

United States Patent Office 2,838,132
Patented June 10, 1958

2,838,132

MEANS FOR REMOVING MOISTURE FROM A GAS

Basil Gervase Markham and Ralph Murch Denning, Bristol, England, assignors, by mesne assignments, to Bristol Aero-Engines Limited, Bristol, England, a British company Application December 19, 1955, Serial No. 554,034

Claims priority, application Great Britain December 9, 1955

5 Claims. (Cl. 183—110)

This invention relates to means for removing moisture from a moisture-laden stream of gas passing through a duct. The invention is particularly, but not exclusively, applicable to the removal of water from air to be compressed and used in a marine gas turbine engine. In a marine application of the invention, it will be realised that, particularly where small ships are concerned, spray or even water may find its way down the air trunking or duct leading to the intake of the gas turbine engine and lead to corrosion and other troubles in the engine. It is very desirable therefore that moisture, whether in the form of spray or water, should be trapped and removed from the air to be used in the gas turbine engine.

According to the invention there is provided means for removing moisture from a moisture-laden stream of gas travelling through a duct which means comprises a row of upright streamlined sectioned vanes carried from the duct, the vanes extending each across the duct from the floor thereof and being arranged side by side and spaced apart transversely of the duct, and draining means for draining from the floor of the duct moisture which has been deposited on the vanes and which has run down the vanes onto the floor of the duct.

When a moisture laden stream of gas traverses the vanes moisture entrained in the gas stream is deposited on the vanes, and in view of the streamlined shape of the vanes boundary layers of relatively slow velocity are formed on the vanes thereby preventing the deposited moisture from being carried away by the gas flow whilst it is running down the vanes. The adhesion of the moisture to the vanes whilst it is running down them may be increased by shaping the vanes to provide a straight trailing edge which is rearwardly inclined in a downwards direction.

The collected moisture may be drained off through one or more drains in the form of channels or series of holes provided in the floor of the duct downstream of the vanes to a manifold or drain-away chamber, and suction caused by any suitable means may be utilised to assist the drainage.

By way of example as applied to the air intake duct of a marine gas turbine engine, the invention is hereinafter described with reference to the accompanying drawings in which.

Figure 1:
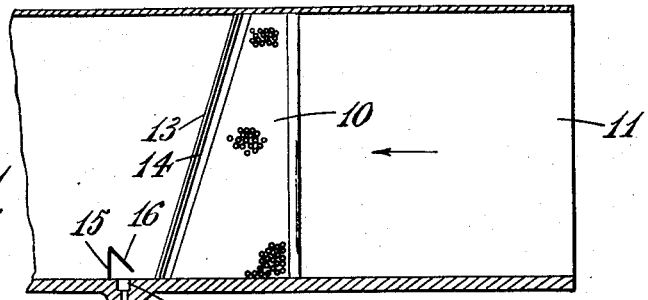
Figure 1 is a cross-sectional side elevation of the air intake duct showing a row of vanes extending transversely across the duct.
Figure 2:
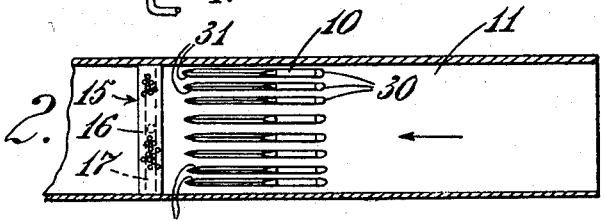
Figure 2 is a plan view corresponding to Figure 1 with the top of the duct removed to show the vanes.

Figures 1 and 2 show one form of the invention having a single row of uprights, by which is to be understood vertical or substantially vertical, vanes 10 providing 50% blockage and spaced transversely across a duct 11 which conveys air to the compressor of the gas turbine engine for use as the working fluid. The moisture which may be in the form of water droplets is carried by the air through the duct, and collides with the row of vanes 10 and is deposited on them. The water so captured has to be removed to a drainage system and the main problem is to prevent its re-entrainment by the passing air flow as it runs down to the drainage system. This means that the water deposited over the surfaces of the vanes must be protected from being blown off by the passing air flow and be encouraged to adhere to the vanes as it runs down to the bottom of the vanes where a drainage system is located on the floor of the duct. To this end, the vanes 10 are given a streamlined shape having rounded leading edges 30 and tapering trailing edge portions 31, so as to promote the formation of boundary layers of relatively low velocity. Due to the deposited water running down the vanes, the concentration of water progressively increases on the vane surfaces from top to bottom and because of this there is a tendency for the water to build up and, particularly at the trailing edges, to break away from the vanes and be carried on by the air flow. To reduce this tendency the trailing edges 13 are inclined rearwardly, at an angle of some 17° for example, so as to increase progressively the chord of the vanes from top to bottom, the trailing edge 13 of each vane being kept straight throughout without any fillet where it joins the floor of the duct 11 so that there is no decrease in the rate of fall along the trailing edge. Furthermore, there is provided on each side of each vane a groove 14, which is parallel with, and immediately upstream of the trailing edge 13 of the vane. The grooves 14 intercept any droplets moving rearwardly across the surfaces of the vanes and cause these droplets to coalesce into downwardly running streams in the grooves 14. In this manner the grooves 14 assist the rate of downwards flow of water collected on the vane surfaces. The arrangement may be such that the airstream meets the vanes at a small angle of incidence to increase the deposit of moisture on the vanes.

A drainage system is provided on the floor of the duct to take away the water which has run down the vanes, as well as any other water which has found its way to the drainage system. This system comprises a small vertical weir or sill 15 extending straight across the floor of the duct along a line adjacent to the trailing edges 13 of the vanes. The top of the sill 15 supports a forwardly and downwardly inclined perforated plate 16, which does not reach the floor of the duct. Beneath the inclined plate 16 is a drainage channel 17 which is formed in and extends across the floor of the duct. The air beneath the inclined plate 16 tends to be sucked out through the perforations in the plate under the influence of the air-stream in the duct, and the resultant reduction in pressure in the region under the plate attracts adjacent water on the floor of the duct into the channel 17, from which the water is led away for disposal. The channel 17 is arranged to lead into an airtight manifold (not shown) which is in communication with a chamber having a slightly lower pressure than that prevailing in the duct in the region of the channel 17, so that a slight suction is created to assist the drain away of the water. This chamber may be the engine room.

Figure 3:
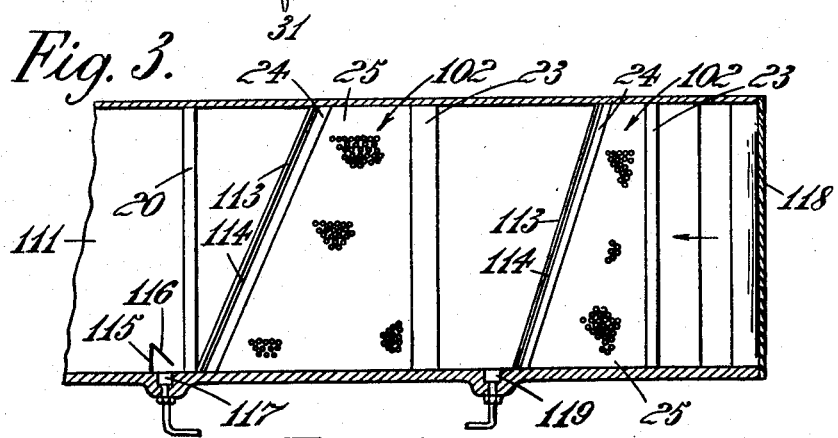
Figure 3 is a cross-sectional side elevation of another air intake duct for a marine gas turbine engine showing two rows of vanes downstream of a baffle member.
Figure 4:
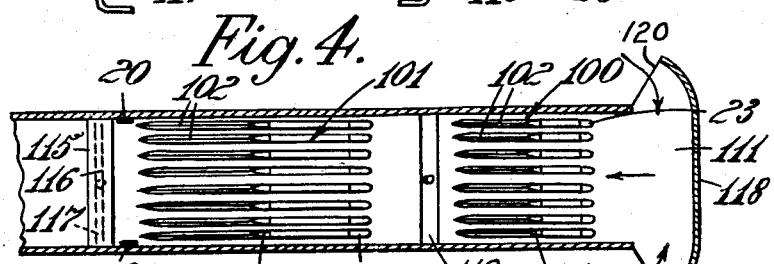
Figure 4 is a plan view corresponding to Figure 3 with the top of the duct removed to show the vanes.

Figures 3 and 4 show another form of the invention applied to the air intake duct 111 of a marine gas turbine engine. In this case air is arranged to enter the duct through two air intake openings 120 disposed one on each side of the duct, the intake openings each facing in a direction turned through an angle approaching 180° from the intended direction of air flow through the duct, and a baffle 118 being provided to turn the air entering the air intakes into the duct 111 in a swirling stream past two rows 100, 101 of upright vanes 102. In the example being described each vane in the rear row 101 of vanes lies in the same plane as the corresponding vane in the front row 100 of vanes. If desired, however, the vanes in the two rows of vanes may be in staggered relationship. Each vane is of streamline shape and has a rounded leading edge as before. The vanes are also provided with rearwardly inclined trailing edges 113 and grooves 114 on each side, adjacent the trailing edge, all as previously described with reference to the vanes shown in Figures 1 and 2. A drainage channel 119 is located downstream of the first row 100 of vanes, the channel being formed in and extending across the floor of the duct 111 to collect the water which has been deposited on and has run down the front row of vanes.

A sill or weir 115 which extends across the floor of the duct is placed near the trailing edges 13 of the rear row of vanes. The top of the sill 115 supports a forwardly and downwardly inclined perforated plate 116 which does not reach the floor of the duct. Beneath the inclined plate 116 is a drainage channel 117 which is formed in and which extends across the floor of the duct. The air beneath the inclined plate 116 tends to be sucked out through the perforations in the plate under the influence of the air stream in the duct, and the resultant reduction in pressure attracts adjacent water on the floor of the duct into the channel 117, from which the water is led away for disposal. The channel 117 may be replaced by a series of drain holes in and extending across the floor of the duct.

The channels 117, 119, in the example being described, are arranged to lead into a common airtight manifold (not shown) which is preferably connected at its other end to a source of pressure lower than that in the duct 111 so that drainage is assisted by a slight suction effect. This may be achieved by connecting the manifold to a suction promoting device or, if appropriate, exhausting the manifold to the engine room.

Each side wall of the duct 111 supports a plate or the like 20 which extends down the wall of the duct and intercepts any water flowing along the duct wall, leading it down to drain away into the rear channel 117.

The floor of the duct may be sloped downwardly in the direction of flow towards the channels 117, 119 or the drain holes so as to assist the drainage of the water as it collects on the floor.

In operation, the air drawn in for the engine is deflected by the baffle 18 to enter the duct 111 and pass through the two rows of vanes 102 in succession. The swirling motion of the air past the vanes helps in the deposition of water droplets in the air flow onto the vanes, which then run down the vanes under the force of gravity to the floor of the duct, where they are trapped by the drainage system, any water escaping past the drainage channels 117, 119 being repelled by the sill 115 until it enters the rear channel 117.

The efficiency of the arrangements above described varies inversely with the speed of air flow, good results being obtained with an air flow of about 70 feet per second.

Figure 5:
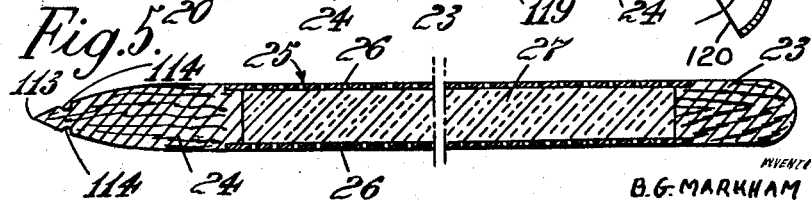
Figure 5 is a cross-section of one of the vanes shown in Figures 1 and 2 or Figures 3 and 4.

Silencing splitter elements are well known per se, and the above-described vanes 10 or 102 are so constructed as to constitute splitter elements for air intakes, so that they have a dual function viz. the reduction of noise and the removal of moisture. In the examples described with reference to Figures 3 and 4, the front vanes 102 comprise leading and trailing edge sections 23 and 24 respectively (see Figure 5) of wood mounted on a central section 25 of perforated metal sheet 26 having an interior padded with an acoustic material 27, such as superfine fibre glass, enclosed in cloth. The rear vanes 102 are similar but the interior of the central section is packed with rock wool or stellite slabs with a density of about 5 lbs./cubic foot.

For a 50% blockage, the front vanes may be two inches thick with two inch spacing.

We claim:

1. In a duct, means for removing moisture from a moisture-laden stream of gas passing through the duct, said means comprising a row of upright streamlined sectioned vanes carried from the duct, the vanes extending each across the duct from the floor thereof and being arranged side by side and spaced apart transversely of the duct, the vanes each having a straight trailing edge which is rearwardly inclined in a downward direction with respect to the long axis of the duct, and a chordal dimension which increases progressively from top to bottom of the vane, and draining means for draining from the floor of the duct moisture which has been deposited on the vanes and which has run down the vanes onto the floor of the duct.

2. Means as claimed in claim 1, wherein each side of each vane is provided with a groove parallel with and upstream of the trailing edge of the vane.

3. Means as claimed in claim 1 wherein the duct is an air intake duct and the intake end of the duct is provided with a pair of intake openings disposed one on each side of the duct, the intake openings each facing in a direction turned through an angle approaching 180° from the intended direction of air flow through the duct, and baffle means is provided to turn the air entering the intake openings into the duct in a swirling stream.

4. Means as claimed in claim 3, wherein the vanes each have a central section formed from perforated sheet material padded on its inside with acoustic material.

5. In a duct, means for removing moisture from a moisture-laden stream of gas passing through the duct, said means comprising a row of upright streamlined sectioned vanes carried from the duct, the vanes extending each across the duct from the floor thereof and being arranged side by side and spaced apart transversely of the duct, the vanes each having a straight trailing edge which is rearwardly inclined in a downward direction with respect to the long axis of the duct, and a chordal dimension which increases progressively from top to bottom of the vane, a drain in and extending across the floor of the duct immediately downstream of said row of vanes and a sill or weir extending across the floor of the duct immediately downstream of said drain.

References Cited in the file of this patent

UNITED STATES PATENTS

| 808,897 | Carrier | Jan. 2, 1906 |
|---|---|---|
| 1,603,878 | Smith | Oct. 19, 1926 |
| 2,349,944 | Dixon | May 30, 1944 |
| 2,532,332 | Rowand | Dec. 5, 1950 |

FOREIGN PATENTS

| 18,665 | Great Britain | Aug. 14, 1914 |
|---|---|---|
| 468,487 | Canada | Oct. 3, 1950 |
| 644,391 | Great Britain | Oct. 11, 1950 |